(12) United States Patent
Zhou et al.

(10) Patent No.: US 10,168,816 B2
(45) Date of Patent: Jan. 1, 2019

(54) ARRAY SUBSTRATE, DISPLAY PANEL AND DISPLAY DEVICE

(71) Applicant: SHANGHAI TIANMA MICRO-ELECTRONICS CO., LTD., Shanghai (CN)

(72) Inventors: Zhiwei Zhou, Shanghai (CN); Qijun Yao, Shanghai (CN); Feng Lu, Shanghai (CN); Liang Liu, Shanghai (CN); Yan Shen, Shanghai (CN); Huafeng Bian, Shanghai (CN); Zhengkui Dong, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/795,037

(22) Filed: Oct. 26, 2017

(65) Prior Publication Data

US 2018/0046286 A1 Feb. 15, 2018

(30) Foreign Application Priority Data

Jun. 30, 2017 (CN) .......................... 2017 1 0522542

(51) Int. Cl.
G06F 3/041 (2006.01)
G06F 3/042 (2006.01)

(52) U.S. Cl.
CPC ............ *G06F 3/0414* (2013.01); *G06F 3/041* (2013.01); *G06F 3/0428* (2013.01); *G06F 2203/04105* (2013.01); *G06F 2203/04107* (2013.01)

(58) Field of Classification Search
None
See application file for complete search history.

(56) References Cited

U.S. PATENT DOCUMENTS

2014/0168879 A1* 6/2014 Xie ..................... H01L 27/0296
361/679.31
2018/0053792 A1* 2/2018 Shin .................... H01L 27/1218

* cited by examiner

*Primary Examiner* — Christopher J Kohlman
(74) *Attorney, Agent, or Firm* — Alston & Bird LLP

(57) ABSTRACT

An array substrate, a display panel and a display device are provided. The array substrate includes a display area and a non-display area surrounding the display area. A first power signal line, a ground potential line and at least one pressure sensor are disposed in the non-display area. The pressure sensor includes a first power signal input terminal and a second power signal input terminal. The first power signal input terminal is electrically connected to the first power signal line. The second power signal input terminal is electrically connected to the ground potential line. The first power signal input terminal and/or the second power signal input terminal is electrically connected to an electro-static discharge unit.

19 Claims, 14 Drawing Sheets

ARRAY SUBSTRATE, DISPLAY PANEL AND DISPLAY DEVICE

CROSS-REFERENCES TO RELATED APPLICATIONS

This application claims priority to Chinese application No. 201710522542.9, filed on Jun. 30, 2017, the disclosure of which is incorporated herein by reference in its entirety.

TECHNICAL FIELD

An embodiment of the present disclosure relates to a display technology, and, in particular, to an array substrate, a display panel and a display device.

BACKGROUND

At present, a touch display screens are provided in more and more electronic devices, e.g., an information inquiry machine in a public service hall, or a computer or a mobile phone used by a user in daily life and work. Using a touch display screen, the user can operate the electronic device by simply touching icons on the touch display screen with a finger, thereby getting rid of the keyboard and mouse operations and making a human-computer interaction more straightforward. To better meet user requirements, the touch display screen is typically provided with one or more pressure sensors for detecting touch pressure values when the user touches the touch display screen.

Static electricity generated by a structure in a display area or a circuit in a non-display area causes damage to the pressure sensors when the touch display screen is being manufactured or is running properly. In addition, when a high intensity current flows through a power line or a ground potential line electrically connected to a signal input terminal of a pressure sensor or when the touch display screen is subjected to electrostatic testing, the pressure sensor is affected by the corresponding static electricity, causing damage or performance deterioration to the pressure sensor.

BRIEF SUMMARY

The present disclosure provides an array substrate, a display panel and a display device to prevent a pressure sensor from being affected by static electricity.

In a first aspect, an embodiment of the present disclosure provides an array substrate including a display area and a non-display area surrounding the display area.

A first power signal line, a ground potential line and a pressure sensor are disposed in the non-display area.

The pressure sensor includes a first power signal input terminal and a second power signal input terminal. The first power signal input terminal of the pressure sensor is electrically connected to the first power signal line. The second power signal input terminal of the pressure sensor is electrically connected to the ground potential line.

The first power signal input terminal and/or the second power signal input terminal is electrically connected to an electro-static discharge unit.

In a second aspect, an embodiment of the present disclosure provides a display panel including the array substrate described in the first aspect.

In a third aspect, an embodiment of the present disclosure provides a display device including the display panel described in the second aspect.

The array substrate provided by the embodiment of the present disclosure includes a display area and a non-display area disposed surrounding the display area. A first power signal line, a ground potential line and at least one pressure sensor are disposed in the non-display area. The pressure sensor includes a first power signal input terminal and a second power signal input terminal. The first power signal input terminal of the pressure sensor is electrically connected to the first power signal line. The second power signal input terminal of the pressure sensor is electrically connected to the ground potential line. The first power signal input terminal and/or the second power signal input terminal is electrically connected to an electro-static discharge unit. In such configurations, static electricity in the first power signal line and the ground potential line and static electricity transmitted to the at least one pressure sensor through other ways can all be discharged via the electro-static discharge unit, preventing the at least one pressure sensor from being damaged by the static electricity.

BRIEF DESCRIPTION OF DRAWINGS

Other features, objects and advantages of the present disclosure will become more apparent from a detailed description of non-restrictive embodiments with reference to the following accompanying drawings.

DETAILED DESCRIPTION

Figure 1:
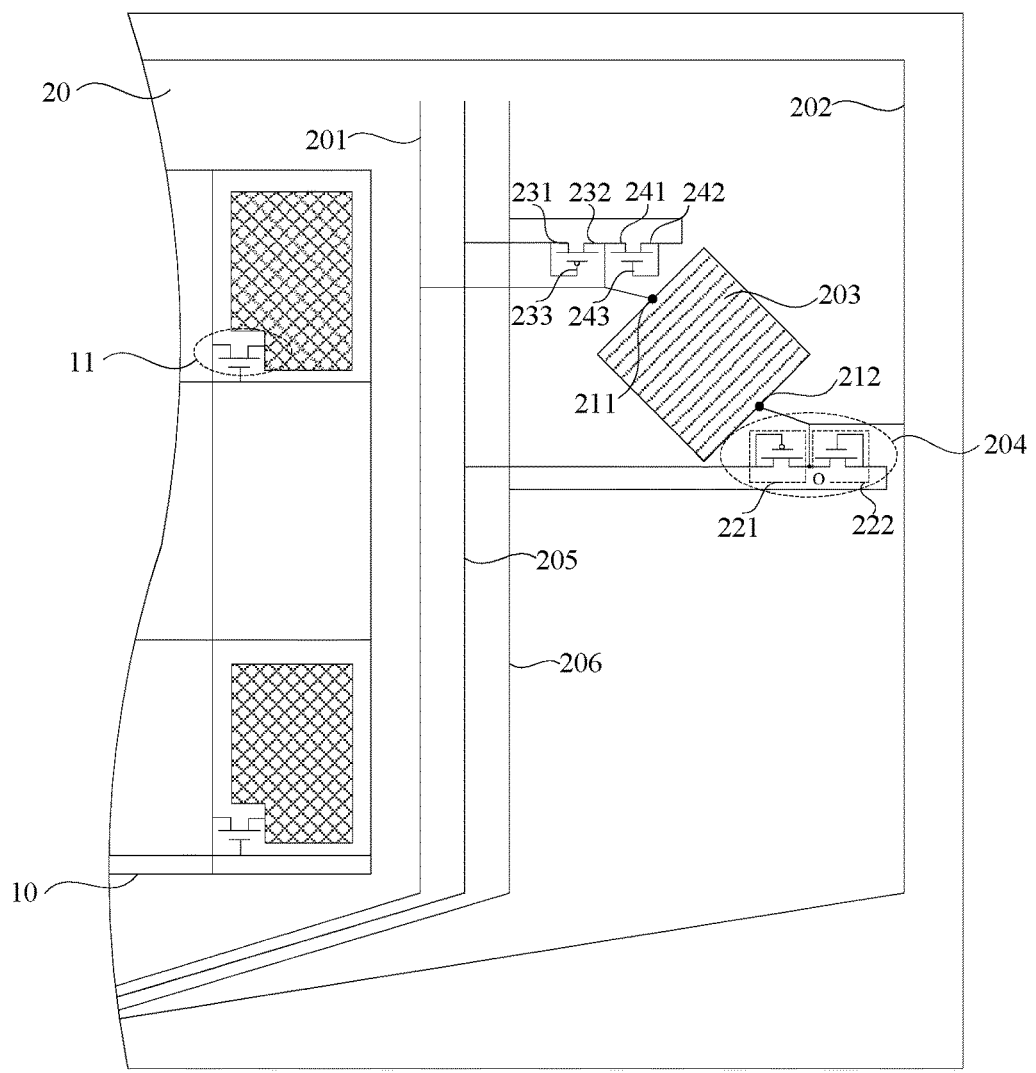
FIG. 1 is a partial circuit diagram of an array substrate according to an embodiment of the present disclosure.

To further elucidate technical means and technical effects for achieving the intended purpose of the present disclosure, embodiments, structures, features and effects of a display panel and a method for manufacturing the same according to the present disclosure are described hereinafter in detail with reference to accompanying drawings and embodiments.

An embodiment of the present disclosure provides an array substrate including a display area and a non-display area surrounding the display area.

A first power signal line, a ground potential line and at least one pressure sensor are disposed in the non-display area.

The pressure sensor includes a first power signal input terminal and a second power signal input terminal. The first power signal input terminal of the pressure sensor is electrically connected to the first power signal line. The second power signal input terminal of the pressure sensor is electrically connected to the ground potential line.

The first power signal input terminal and/or the second power signal input terminal is electrically connected to an electro-static discharge unit.

The array substrate provided by an embodiment of the present disclosure includes a display area and a non-display area surrounding the display area. A first power signal line, a ground potential line and at least one pressure sensor that are disposed in the non-display area. The pressure sensor includes a first power signal input terminal and a second power signal input terminal. The first power signal input terminal of the pressure sensor is electrically connected to the first power signal line. The second power signal input terminal of the pressure sensor is electrically connected to the ground potential line. The first power signal input terminal and/or the second power signal input terminal is electrically connected to an electro-static discharge unit. In such configurations, static electricity in the first power signal line and the ground potential line and static electricity transmitted to the at least one pressure sensor through other ways can all be discharged via the electro-static discharge unit, preventing the at least one pressure sensor from being damaged by the static electricity.

The above is the core idea of the present disclosure. Technical solutions in embodiments of the present disclosure will be described clearly and completely in conjunction with accompanying drawings in embodiments of the present disclosure. The described embodiments are merely part, not all, embodiments of the present disclosure. Based on embodiments of the present disclosure, all other embodiments obtained by those skilled in the art without creative work are within the scope of the present disclosure.

Details are set forth below to facilitate a thorough understanding of the present disclosure. However, the present disclosure may be implemented by other embodiments different from the embodiments described herein, and those skilled in the art may make similar generalizations without departing from the spirit of the present disclosure. Therefore, the present disclosure is not limited to the specific embodiments disclosed below.

The present disclosure will be described in detail with reference to schematic diagrams. In detailed description of embodiments of the present disclosure, for ease of description, schematic diagrams illustrating structures of devices and components are not necessarily drawn to scale. The schematic diagrams are merely illustrative and are not intended to limit the scope of the present disclosure. In practice, manufacturing involves three-dimension spatial sizes: length, width and height.

FIG. 1 is a partial circuit diagram of an array substrate according to an embodiment of the present disclosure. As illustrated in FIG. 1, the array substrate includes a display area 10 and a non-display area 20 disposed surrounding the display area 10. A first power signal line 201, a ground potential line 202 and at least one pressure sensor 203 are disposed in the non-display area 20. The pressure sensor 203 includes a first power signal input terminal 211 and a second power signal input terminal 212. The first power signal input terminal 211 of the pressure sensor 203 is electrically connected to the first power signal line 201. The second power signal input terminal 212 of the pressure sensor 203 is electrically connected to the ground potential line 202. The first power signal input terminal 211 and the second power signal input terminal 212 are electrically connected to an electro-static discharge unit 204.

It should be noted that, FIG. 1 illustrates the array substrate that includes one pressure sensor 203 disposed in the non-display area 20 and is not intended to limit quantity and positions of pressure sensors 203. In other implementation modes of the present embodiment, the quantity of the pressure sensor 203 included in the array substrate may be two or more, and the at least one pressure sensor 203 may also be partially disposed in the display area 10 or all be disposed in the display area 10.

It should be further noted that the electro-static discharge unit 204 is used for discharging static electricity to be transmitted to the pressure sensor 203. The first power signal input terminal 211 and the second power signal input terminal 212 are ports where the pressure sensor 203 is connected to an external line and are also paths through which the static electricity is transmitted to the pressure sensor 203. Therefore, when the electro-static discharge unit 204 is electrically connected to the first power signal input terminal 211 and the second power signal input terminal 212, the electro-static discharge unit 204 can timely discharge static electricity transmitted through the first power signal line 201 and the ground potential line 202 to prevent the pressure sensor 203 from being affected by static electricity. In other implementation modes of the present embodiment, the electro-static discharge unit 204 may be electrically connected to only the first power signal input terminal 211 or to only the second power signal input terminal 212. In such configurations, the electro-static discharge unit 204 can also reduce the impact of static electricity on the pressure sensor 203.

The array substrate provided by the embodiment of the present disclosure includes the display area 10 and the non-display area 20 surrounding the display area 10. The first power signal line 201, the ground potential line 202 and at least one pressure sensor 203 are disposed in the non-display area 20. The pressure sensor 203 includes the first power signal input terminal 211 and the second power signal input terminal 212. The first power signal input terminal 211 of the pressure sensor 203 is electrically connected to the first power signal line 201. The second power signal input terminal 212 of the pressure sensor 203 is electrically connected to the ground potential line 202. The first power signal input terminal 211 and/or the second power signal input terminal 212 is electrically connected to the electro-static discharge unit 204. In such configurations, static electricity in the first power signal line 201 and the ground potential line 202 and static electricity transmitted to the at least one pressure sensor 203 through other ways can all be discharged via the electro-static discharge unit 204, preventing the at least one pressure sensor 203 from being damaged by static electricity.

As illustrated in FIG. 1, the pressure sensor 203 may be a rhombus. A diagonal of the rhombus is disposed parallel with the first power signal line 201. The electro-static discharge unit 204 is located along any side of the rhombus and is located outside the rhombus. Lines disposed in the non-display area 20 are typically parallel with an edge of the array substrate, i.e., parallel with or vertical to the extending direction of the first power signal line 201 as illustrated in FIG. 1. Thus, positions next to four sides and corners of the rhombic pressure sensor 203 are a non-wiring area. When the electro-static discharge unit 204 is disposed at these positions, free space of the array substrate can be utilized effectively and structures or wiring surrounding the pressure sensor 203 can retain original designs.

With reference to FIG. 1, the electro-static discharge unit 204 may at least include a NMOS 222 and a PMOS 221. A first electrode 241 of the NMOS 222 and a second electrode 232 of the PMOS 221 are electrically connected to each other and are electrically connected to the first power signal input terminal 211 or the second power signal input terminal 212. A gate electrode 243 and a second electrode 242 of the NMOS 222 are electrically connected to a low level line 206. A gate electrode 233 and a first electrode 231 of the PMOS 221 are electrically connected to a high level line 205.

It should be noted that the first electrode and the second electrode may be a source electrode and a drain electrode respectively or be a drain electrode and a source electrode respectively. As illustrated in FIG. 1, in the case that the electro-static discharge unit 204 is connected to the second power signal input terminal 212 of the pressure sensor 203, one NMOS 222 and one PMOS 221 form a CMOS, and a connection point between the CMOS and the second power signal input terminal 212 is denoted as connection point O. In one embodiment, the NMOS 222 is turned on at a high level and the PMOS 221 is turned on at a low level, when a voltage of the connection point O is greater than a voltage of the high level line 205, the PMOS 221 is turned on, the NMOS 222 is turned off and static electricity is discharged from a path where the PMOS 221 is located. When the voltage of the connection point O is less than a voltage of the low level line 206, the NMOS 222 is turned on, the PMOS 221 is turned off and static electricity is discharged from a path where the NMOS 222 is located.

The quantity of NMOSs 222 included in the electro-static discharge unit 204 is not limited to one. The quantity of PMOSs 221 included in the electro-static discharge unit 204 is not limited to one. In other implementation modes of the present embodiment, the electro-static discharge unit 204 may include multiple NMOSs 222 and multiple PMOSs 221.

Figure 2:
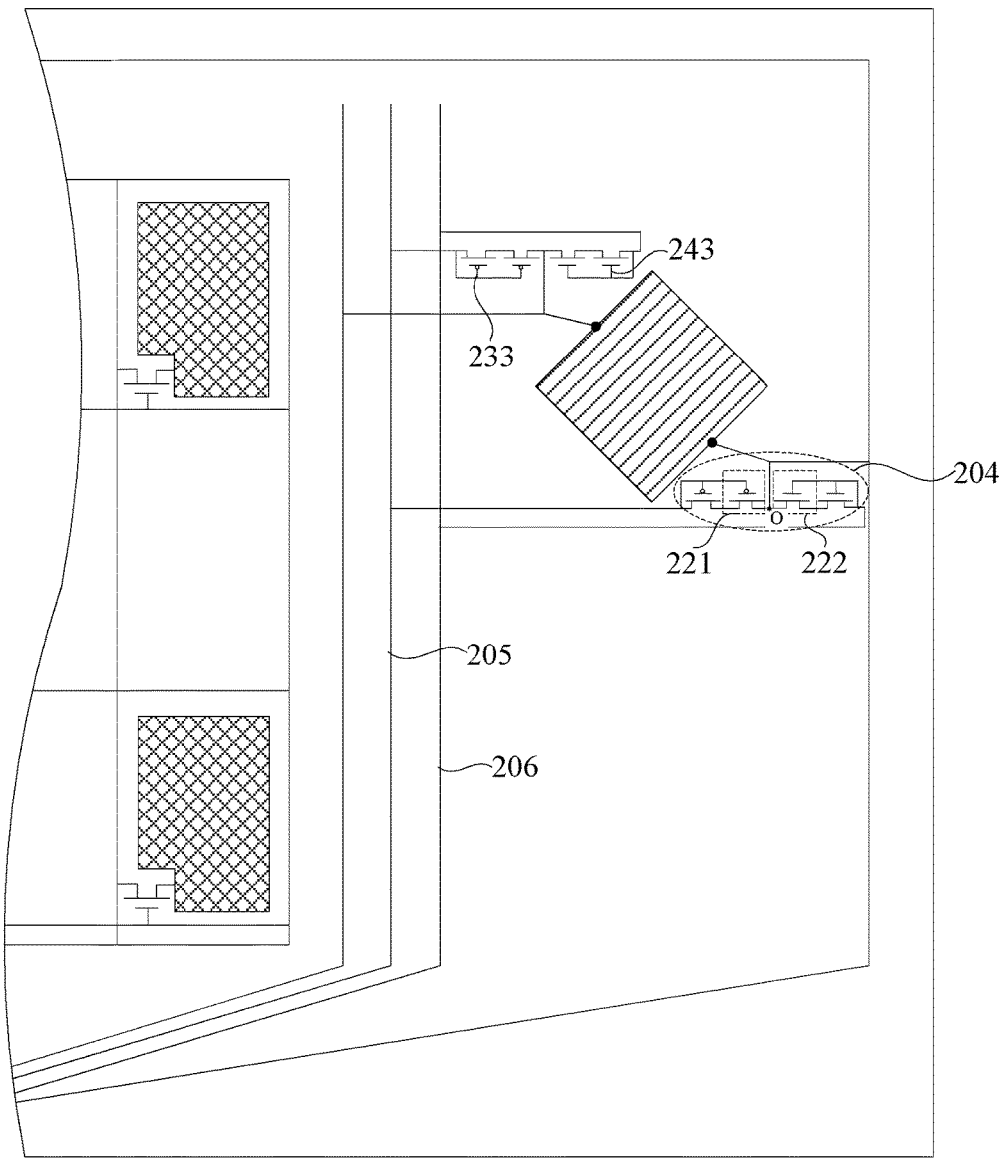
FIG. 2 is a partial circuit diagram of another array substrate according to an embodiment of the present disclosure.

FIG. 2 is a partial circuit diagram of another array substrate according to an embodiment of the present disclosure. As illustrated in FIG. 2, the electro-static discharge unit 204 includes two NMOSs 222 in series electrically connected to one side of the connection point O and two PMOSs 221 in series electrically connected to the other side of the connection point O. A gate electrode 243 of each NMOS 222 is electrically connected to the low level line 206. A gate electrode 233 of each PMOS 221 is electrically connected to the high level line 205. The operation of the electro-static discharge unit 204 illustrated in FIG. 2 is the same as that illustrated in FIG. 1 and thus will not be described herein.

In one embodiment, as illustrated in FIG. 1, a voltage of the first power signal input terminal 211 may be less than a voltage of the high level line 205, and an absolute value of a voltage of the second power signal input terminal 212 may be less than a voltage of the low level line 206. In such configurations, the NMOS 222 and the PMOS 221 are both turned off when a display screen is running properly, thus preventing the electro-static discharge unit 204 from causing the display screen to run improperly.

In one embodiment, a scanning drive circuit is disposed in the non-display area 20. A high level power line and a low level power line of the scanning drive circuit may be reused as the high level line 205 and the low level line 206 respectively. Such configurations can reduce the quantity of lines in the on-display area 20, thus facilitating a narrow bezel of the display screen or reserving sufficient space for other circuit lines.

The first power signal line 201 and the ground potential line 202 both have small resistance and easily undergo strong current to generate static electricity. Such static electricity affects the pressure sensor 203 electrically connected to the first power signal line 201 and the ground potential line 202. Through configurations of the electro-static discharge unit 204, static electricity in the first power signal line 201 and/or the ground potential line 202 and to be transmitted to the pressure sensor 203 can be timely discharged. Furthermore, the voltage of the first power signal input terminal 211 is configured to be less than the voltage of the high level line 205 and the absolute value of the voltage of the second power signal input terminal 212 is configured to be less than the voltage of the low level line 206 so that static electricity generated by the high level line 205 and the low level line 206 formed by reuse of the high level power line and the low level power line of the scanning drive circuit is not transmitted through the corresponding electro-static discharge unit 204 to the pressure sensor 203, thus preventing the pressure sensor 203 from being affected.

As illustrated in FIG. 1, the display area 10 includes multiple first transistors 11 and the non-display area 20 includes multiple second transistors (not illustrated). A channel width-to-length ratio of at least one of the NMOS 222 and the PMOS 221 in the electro-static discharge unit 204 is greater than a channel width-to-length ratio of any one of the first transistors 11 and greater than a channel width-to-length ratio of any one of the second transistors. A transistor with a larger channel width-to-length ratio has smaller on-resistance. Thus, in the preceding configurations, on-resistance of the NMOS 222 and/or the PMOS 221 in the electro-static discharge unit 204 is less than on-resistance of any one of the first transistors 11 and less than on-resistance of any one of the second transistors (not illustrated) so that static electricity can be discharged from the electro-static discharge unit 204 with smaller on-resistance and the discharging rate is improved.

Figure 3:
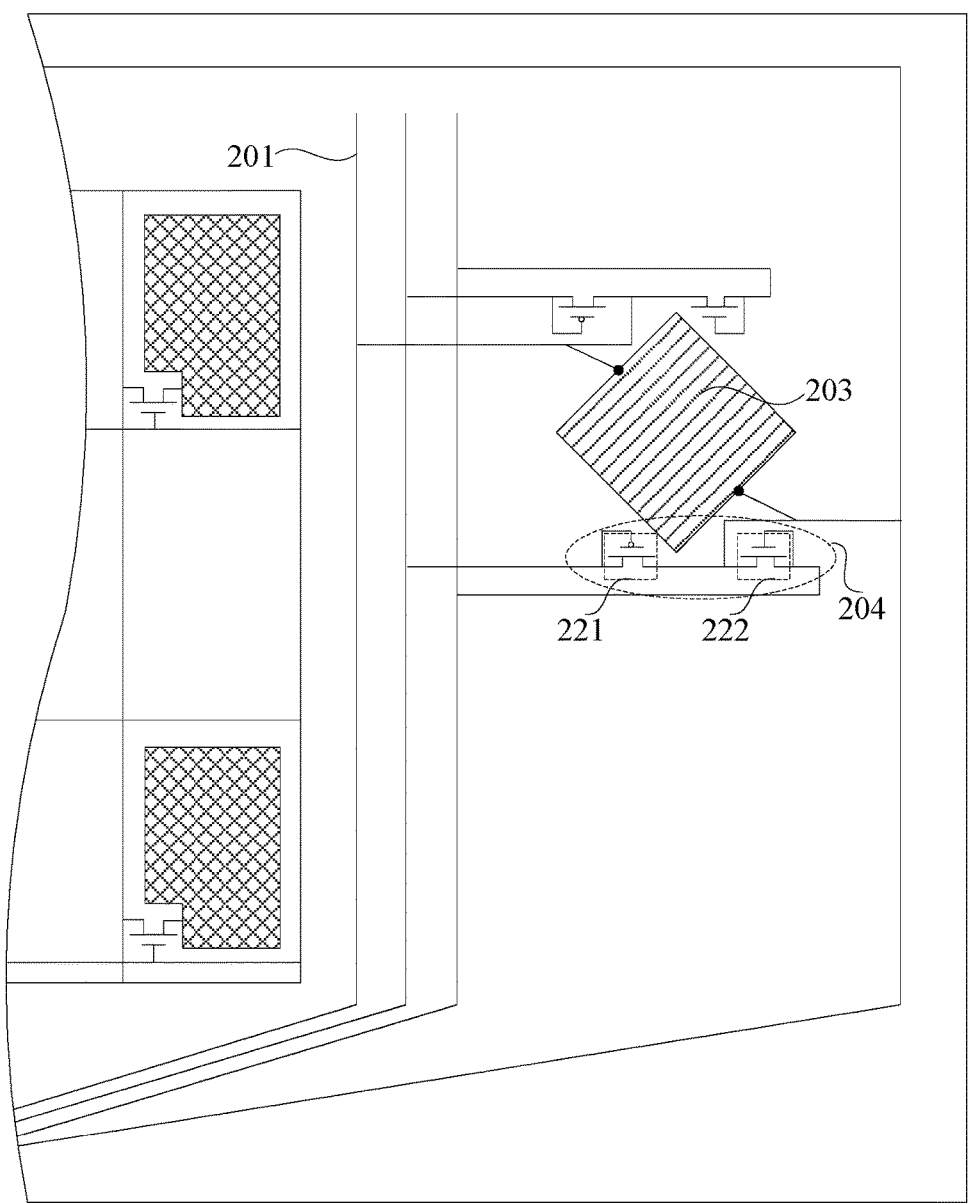
FIG. 3 is a partial circuit diagram of yet another array substrate according to an embodiment of the present disclosure.

FIG. 3 is a partial circuit diagram of yet another array substrate according to an embodiment of the present disclosure. As illustrated in FIG. 3, the pressure sensor 203 is a rhombus. A diagonal of the rhombus is disposed parallel with the first power signal line 201. A structure of the array substrate in FIG. 3 is similar to that in FIG. 1 except that the NMOS 222 and the PMOS 221 of the same electro-static discharge unit 204 in FIG. 3 are disposed at adjacent sides of the rhombus respectively and located outside the rhombus. In such configurations, when in larger sizes, the NMOS 222 and the PMOS 221 can still be disposed at non-wiring positions next to four sides and corners of the rhombic pressure sensor 203 and thus can still effectively utilize spare space of the array substrate.

Figure 4:
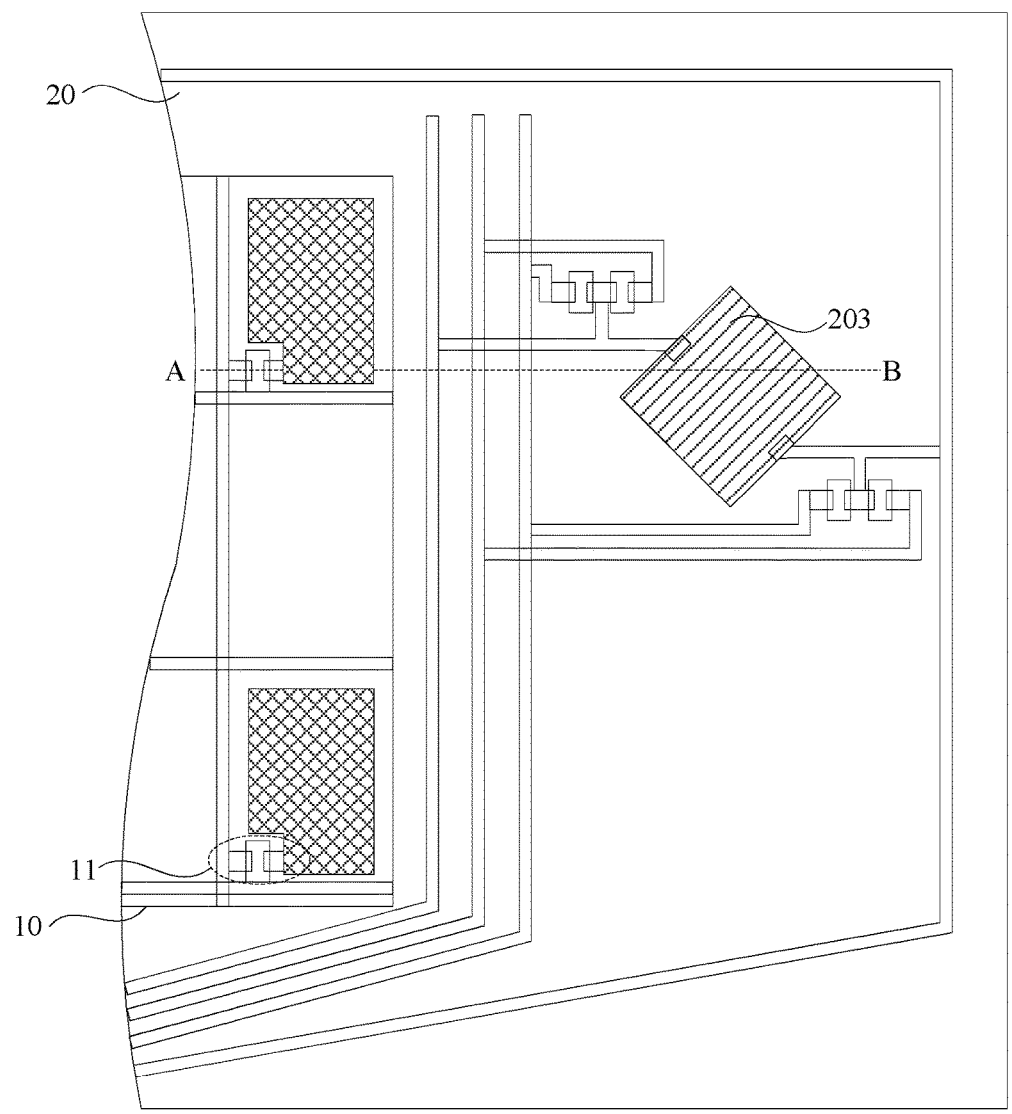
FIG. 4 is a partial structural diagram of the array substrate in FIG. 1.
Figure 5:
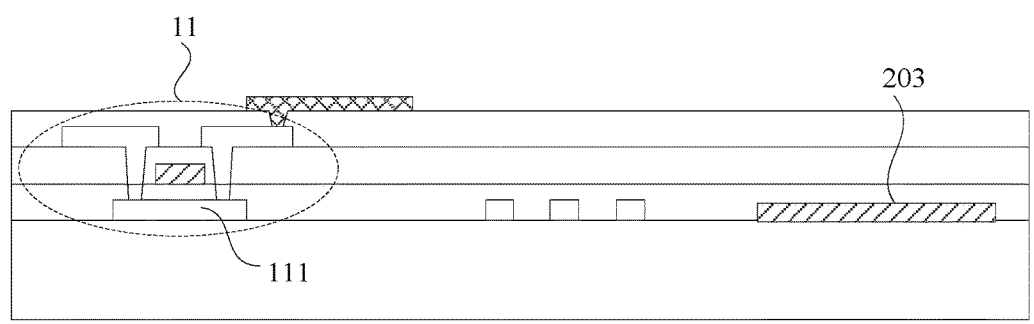
FIG. 5 is a sectional view taken along a dotted line AB in FIG. 4.

FIG. 4 is a partial structural diagram of the array substrate in FIG. 1. As illustrated in FIG. 4, the array substrate includes a display area 10 and a non-display area 20 surrounding the display area 10. Multiple first transistors 11 are disposed in the display area 10. FIG. 5 is a sectional view taken along a dotted line AB in FIG. 4. As illustrated in FIG. 5, the pressure sensor 203 and a semiconductor layer 111 of the first transistors 11 are disposed at a same layer. Such configurations can reduce the quantity of films of the array substrate and facilitate thinning of the display screen.

In one embodiment, the pressure sensor 203 and the semiconductor layer 111 of the first transistors 11 may be formed in a same processing step. Such configurations can reduce one processing step in a process of manufacturing the array substrate, thus simplifying a process of manufacturing the display screen. It is to be appreciated that, in other implementation modes of the present embodiment, the pressure sensor 203 and the semiconductor layer 111 of the first transistors 11 may be formed in different processing steps.

Figure 6:
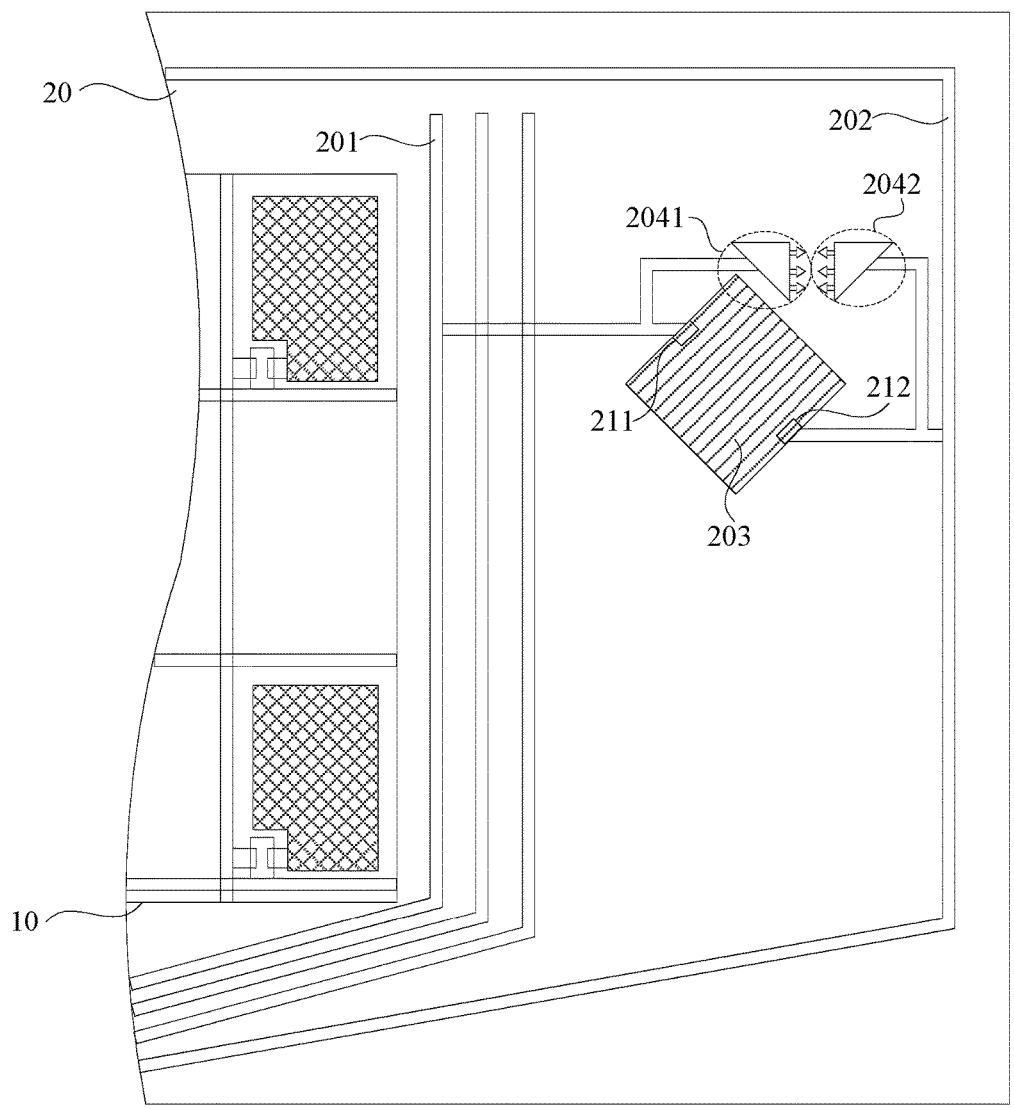
FIG. 6 is a partial structural diagram of an array substrate according to an embodiment of the present disclosure.

FIG. 6 is a partial structural diagram of an array substrate according to an embodiment of the present disclosure. As illustrated in FIG. 6, the array substrate includes a display area 10 and a non-display area 20 surrounding the display area 10. A first power signal line 201, a ground potential line 202 and at least one pressure sensor 203 are disposed in the non-display area 20. The pressure sensor 203 includes a first power signal input terminal 211 and a second power signal input terminal 212. The first power signal input terminal 211 of the pressure sensor 203 is electrically connected to the first power signal line 201. The second power signal input terminal 212 of the pressure sensor 203 is electrically connected to the ground potential line 202. Each of the first power signal input terminal 211 and the second power signal input terminal 212 is electrically connected to an electro-static discharge unit 204. The electro-static discharge unit 204 is a point discharge electrode. The first power signal input terminal 211 is electrically connected to a first electro-static discharge unit 2041 and the second power signal input terminal 212 is electrically connected to a second electro-static discharge unit 2042. Static electricity is discharged by the first electro-static discharge unit 2041 and the second electro-static discharge unit 2042 via point discharge.

Figure 7:
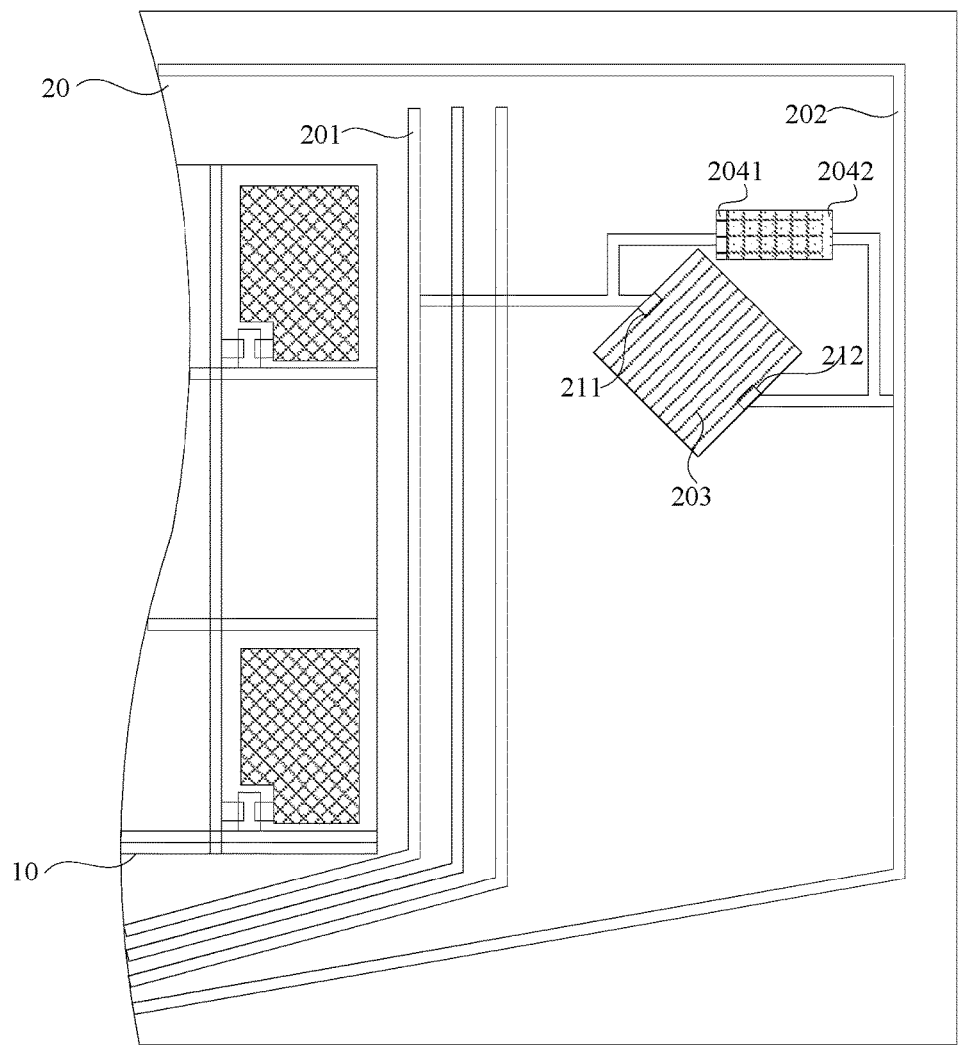
FIG. 7 is a partial structural diagram of another array substrate according to an embodiment of the present disclosure.

FIG. 7 is a partial structural diagram of another array substrate according to an embodiment of the present disclosure. As illustrated in FIG. 7, the array substrate includes a display area 10 and a non-display area 20 surrounding the display area 10. A first power signal line 201, a ground potential line 202 and at least one pressure sensor 203 are disposed in the non-display area 20. The pressure sensor 203 includes a first power signal input terminal 211 and a second power signal input terminal 212. The first power signal input terminal 211 of the pressure sensor 203 is electrically connected to the first power signal line 201. The second power signal input terminal 212 of the pressure sensor 203 is electrically connected to the ground potential line 202. Each of the first power signal input terminal 211 and the second power signal input terminal 212 are electrically connected to an electrostatic discharge unit 204. The electro-static discharge unit 204 is a capacitor plate. In one embodiment, the first power signal input terminal 211 is electrically connected to a first electro-static discharge unit 2041 and the second power signal input terminal 212 is electrically connected to a second electro-static discharge unit 2042. Static electricity is discharged by the first electro-static discharge unit 2041 and the second electro-static discharge unit 2042 via capacitor discharge.

Figure 8:
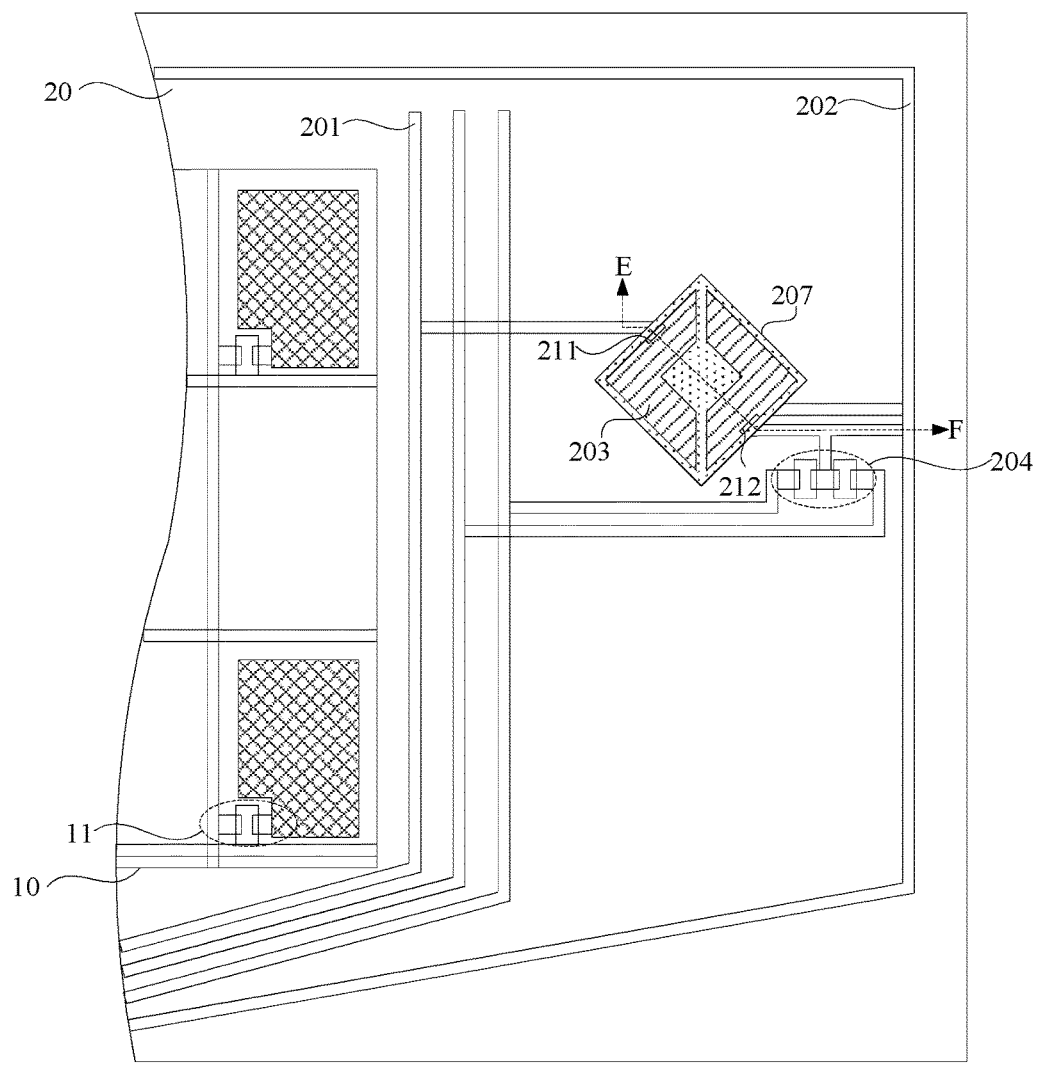
FIG. 8 is a partial structural diagram of yet another array substrate according to an embodiment of the present disclosure.
Figure 9:
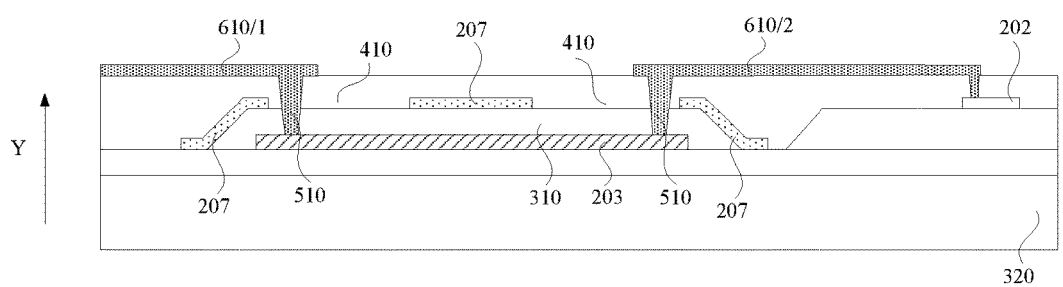
FIG. 9 is a sectional view taken along a dotted line EF in FIG. 8.

FIG. 8 is a partial structural diagram of yet another array substrate according to an embodiment of the present disclosure. As illustrated in FIG. 8, the array substrate includes a display area 10 and a non-display area 20 surrounding the display area 10. A first power signal line 201, a ground potential line 202 and at least one pressure sensor 203 are disposed in the non-display area 20. The pressure sensor 203 includes a first power signal input terminal 211 and a second power signal input terminal 212. The first power signal input terminal 211 of the pressure sensor 203 is electrically connected to the first power signal line 201. The second power signal input terminal 212 of the pressure sensor 203 is electrically connected to the ground potential line 202. The second power signal input terminal 212 is electrically connected to an electro-static discharge unit 204. The array substrate 10 further includes an electrostatic conductive layer 207. The electrostatic conductive layer 207 is electrically connected to the ground potential line 202. FIG. 9 is a sectional view taken along a dotted line EF in FIG. 8. As illustrated in FIG. 9, an insulating layer 310 is disposed between the electrostatic conductive layer 207 and the pressure sensor 203. The electrostatic conductive layer 207 covers a part of the pressure sensor 203 in a stacking direction Y (vertical) of films of the array substrate.

It should be noted that, in a structure of films of the array substrate, a film where the pressure sensor 203 is located is close to a glass substrate 320 of the array substrate, and a film for forming circuit lines is typically located on a side, facing away from the glass substrate 320, of the pressure sensor 203. Therefore, static electricity transmitted to the pressure sensor 203 and generated in non-contact manner is typically from the side, facing away from the glass substrate 320, of the pressure sensor 203. In view of the above problem, in an embodiment, the electrostatic conductive layer 207 is disposed on the side, facing away from the glass substrate 320, of the pressure sensor 203, so that static electricity generated and generated in non-contact manner is blocked by the electrostatic conductive layer 207 and cannot be transmitted to the pressure sensor 203, thereby preventing the pressure sensor 203 from being affected by static electricity. In one embodiment, only the first power signal input terminal 211 may be electrically connected to the electro-static discharge unit 204, or each of a first power signal input terminal 211 and a second power signal input terminal 212 may be electrically connected to an electro-static discharge unit 204.

As illustrated in FIG. 9, the electrostatic conductive layer 207 includes at least one opening 410. The insulating layer 310 is an area where each opening 410 is located includes a through hole 510. The first power signal input terminal 211 and the second power signal input terminal 212 are electrically connected to corresponding signal lines 610 via the through holes 510.

As illustrated in FIGS. 8 and 9, a first signal line 610/1 for electrically connecting the first power signal input terminal 211 and the first power signal line 201, and a second signal line 610/2 for electrically connecting the second power signal input terminal 212 and the ground potential line 202 are typically disposed on a layer different from structures such as the ground potential line 202 and the pressure sensor 203, and are located on a side, facing away from the glass substrate 320, of the electrostatic conductive layer 207. Therefore, in order for the first power signal input terminal 211 and the second power signal input terminal 212 to be electrically connected to corresponding signal lines 610, the electrostatic conductive layer 207 is provided with openings 410 and holes 510 for achieving the preceding electric connections in areas where openings 410 are located. In one embodiment, when the layer where the first signal line 610/1 and the second signal line 610/2 are located is disposed between the electrostatic conductive layer 207 and the pressure sensor 203, the electrostatic conductive layer 207 does not hinder the first power signal input terminal 211 and the second power signal input terminal 212 from being electrically connected to corresponding signal lines 610. In this case, the electrostatic conductive layer 207 may be provided with no opening 410, so that the electrostatic conductive layer 207 can fully cover the pressure sensor 203. Therefore, it should be noted that only one of the first power signal input terminal 211 and the second power signal input terminal 212 may be configured to be electrically connected to a corresponding signal line 610 via a corresponding opening on the electrostatic conductive layer 207.

Static electricity accumulated in the electrostatic conduction layer 207 can be discharged not only by the ground potential line 202 but also by the electro-static discharge unit 204. Therefore, in other implementation modes of the present embodiment, the electrostatic conduction layer 207 may be electrically connected to the electro-static discharge unit 204. It is to be appreciated that the electrostatic conduction layer 207 may be electrically connected to the ground potential line 202 and the electro-static discharge unit 204 simultaneously. Moreover, in the case where the electro-static discharge unit 204 is a point discharge electrode, a first point discharge electrode may be electrically connected to the electrostatic conduction layer 207 or the electro-static discharge unit 204 and a second point discharge electrode may be electrically connected to the ground potential line 202. Alternatively, the first point discharge electrode may be electrically connected to the electrostatic conduction layer 207 and the first power signal line 201 and the second point discharge electrode may be electrically connected to the ground potential line 202. The first point discharge electrode and the second point discharge electrode are used for discharging static electricity via point discharge.

In one embodiment, as illustrated in FIG. 9, the insulating layer 310 extends to outside an edge of the pressure sensor 203 and has a ramp outside the edge of the pressure sensor 203, and the electrostatic conductive layer 207 covers the ramp.

It should be noted that point discharge easily occurs at an edge of the electrostatic conductive layer 207, making the pressure sensor 203 subjected to damage of static electricity. In the preceding configurations, the electrostatic conductive layer 207 can shield the edge of the pressure sensor 203 and thus can protect the pressure sensor 203 from being damaged by static electricity.

Figure 10:
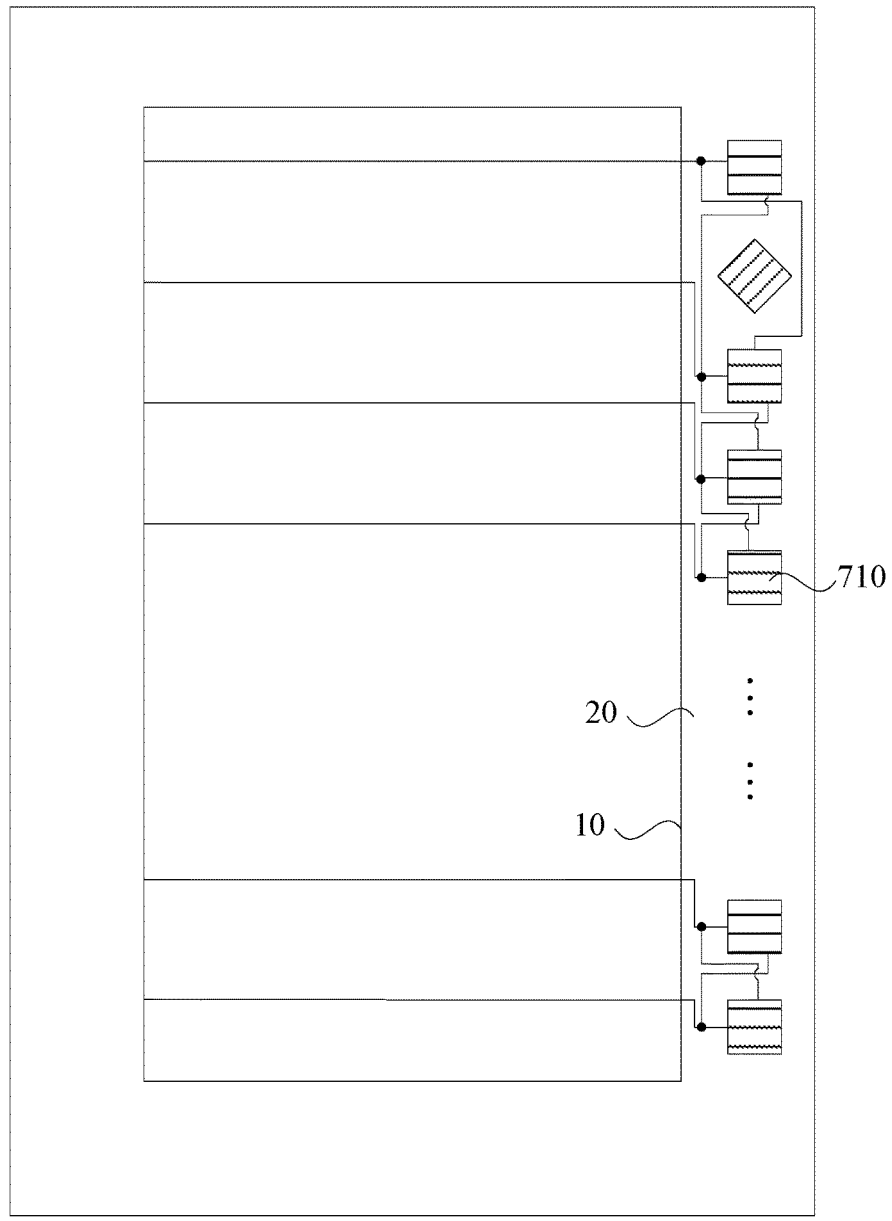
FIG. 10 is a circuit diagram of an array substrate according to an embodiment of the present disclosure.

FIG. 10 is a circuit diagram of an array substrate according to an embodiment of the present disclosure. As illustrated in FIG. 10, the array substrate includes a display area 10 and a non-display area 20 surrounding the display area 10. A scanning drive circuit is disposed in the non-display area 20. The scanning drive circuit includes multiple cascaded shift registers 70. The at least one pressure sensor 203 is located between two of the cascaded shift registers 710.

Figure 11:
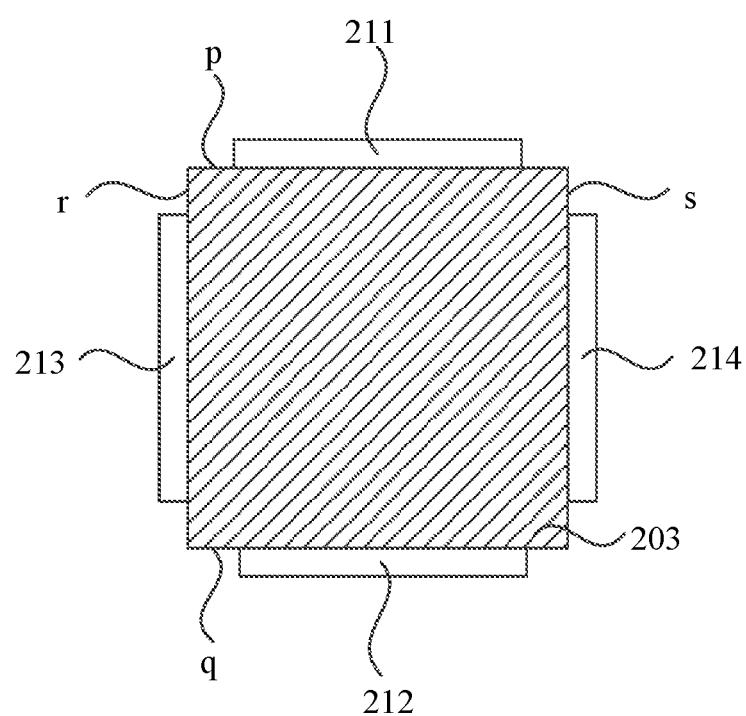
FIG. 11 is a structural diagram of a pressure sensor according to an embodiment of the present disclosure.

FIG. 11 is a structure diagram of a pressure sensor according to an embodiment of the present disclosure. With reference to FIG. 11, the pressure sensor 203 includes a first power signal input terminal 211 and a second power signal input terminal 212. Moreover, the pressure sensor 203 further includes a first sensing signal measuring terminal 213 and a second sensing signal measuring terminal 214. The pressure sensor 203 is a polygon including at least four sides. The first power signal input terminal 211 is located at a first side P of the polygon and the second power signal input terminal 212 is located at a second side Q of the polygon. The first power signal input terminal 211 and the second power signal input terminal 212 are used for inputting a power driving signal to the pressure sensor 203. The first sensing signal measuring terminal 213 is located at a third side R of the polygon and the second sensing signal measuring terminal 214 is located at a fourth side S of the polygon. The first sensing signal measuring terminal 213 and the second sensing signal measuring terminal 214 are used for outputting a pressure detection signal from the pressure sensor 203. A first straight line where the first power signal input terminal 211 and the second power signal input terminal 212 are located intersects a second straight line where the first sensing signal measuring terminal 213 and the second sensing signal measuring terminal 214 are located.

Figure 12:
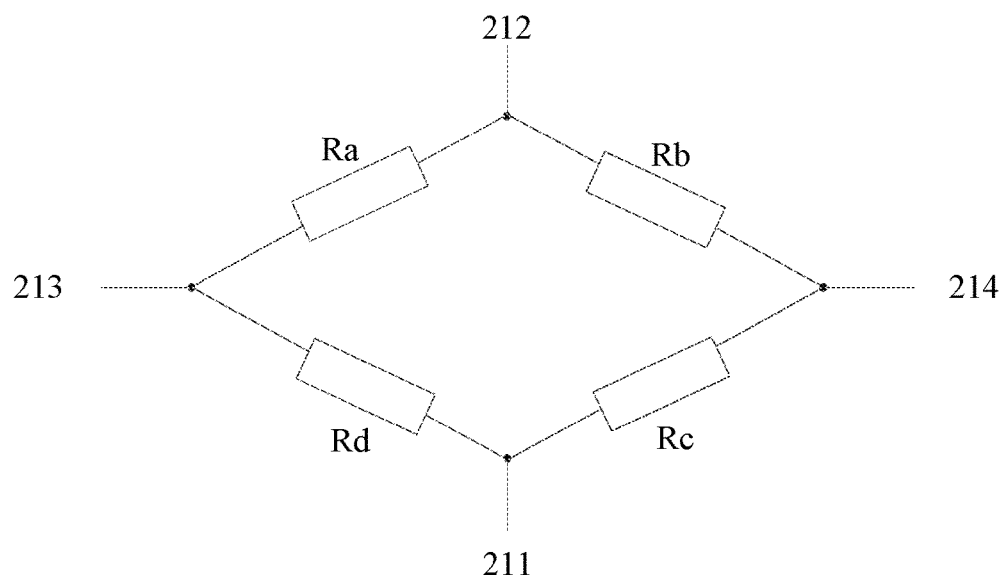
FIG. 12 is an equivalent circuit diagram of the pressure sensor in FIG. 11.

FIG. 12 is a circuit diagram of the pressure sensor in FIG. 11. With reference to FIGS. 11 and 12, the pressure sensor 203 may be equivalent to a Wheatstone bridge. The Wheatstone bridge consists of four equivalent resistors, i.e., an equivalent resistor Ra, an equivalent resistor Rb, an equivalent resistor Rc and an equivalent resistor Rd. An area between the second power signal input terminal 212 and the first sensing signal measuring terminal 213 is the equivalent resistor Ra. An area between the second power signal input terminal 212 and the second sensing signal measuring terminal 214 is the equivalent resistor Rb. An area between the first power signal input terminal 211 and the first sensing signal measuring terminal 213 is the equivalent resistor Rd. An area between the first power signal input terminal 211 and the second sensing signal measuring terminal 214 is the equivalent resistor Rc. When a bias voltage signal is input to the first power signal input terminal 211 and the second power signal input terminal 212, a current flows through each branch in the Wheatstone bridge. In this case, when a display panel is pressed, impedance of at least one of the equivalent resistor Ra, the equivalent resistor Rb, the equivalent resistor Rc and/or the equivalent resistor Rd changes since the pressure sensor 203 is subjected to shear force from a corresponding position on the display panel, so that a difference between the pressure detection signal outputted from the first sensing signal measuring terminal 213 and the pressure detection signal outputted from the second sensing signal measuring terminal 214 is different from that before the pressing, and accordingly a touch pressure value is determined.

Figure 13:
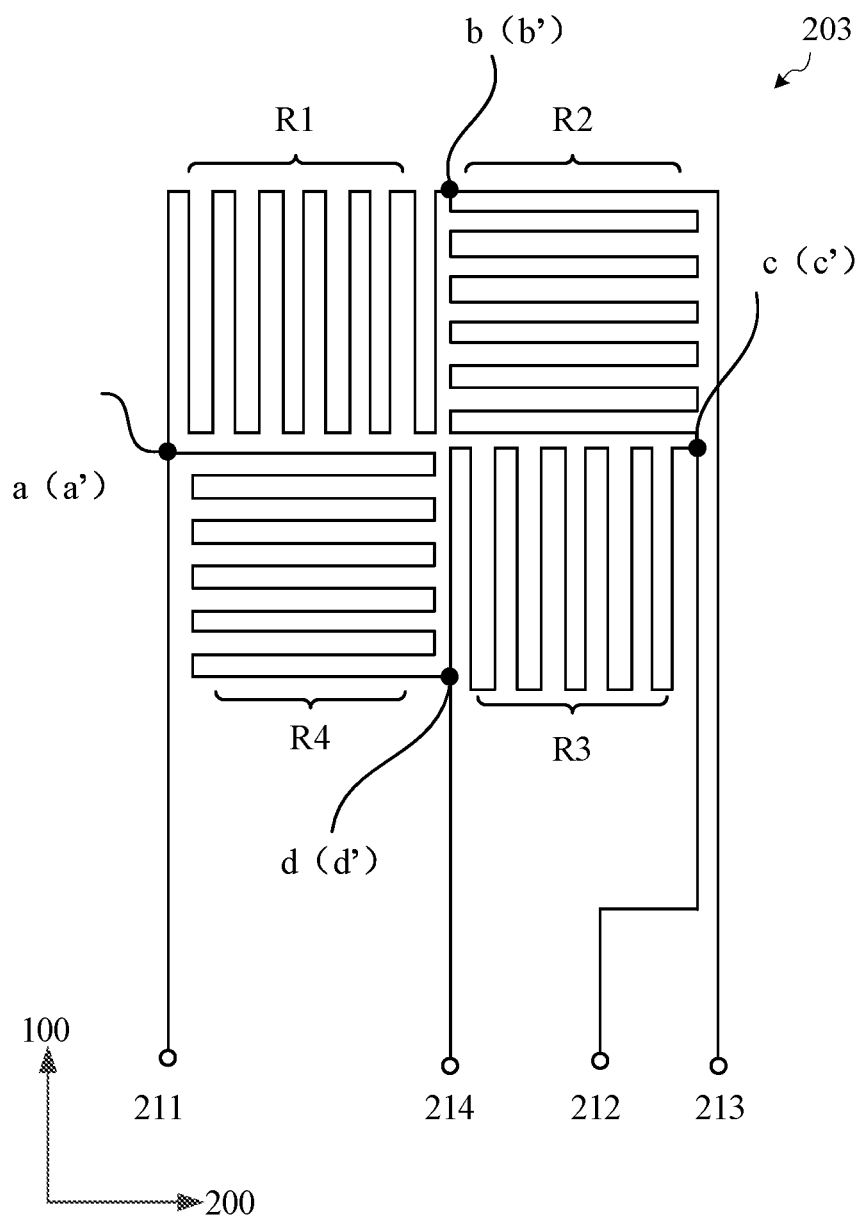
FIG. 13 is a structural diagram of another pressure sensor according to an embodiment of the present disclosure.

FIG. 13 is a structural diagram of another pressure sensor according to an embodiment of the present disclosure. With reference to FIG. 13, the pressure sensor 203 includes a first power signal input terminal 211 and a second power signal input terminal 212. Moreover, the pressure sensor 203 further includes a first sensing signal measuring terminal 213 and a second sensing signal measuring terminal 214. Moreover, the pressure sensor 203 further includes a first sense resistor R1, a second sense resistor R2, a third sense resistor R3 and a fourth sense resistor R4. A first terminal of the first sense resistor R1 and a first terminal A' of the fourth sense resistor R4 are electrically connected to the first power signal input terminal 211. A second terminal B of the first sense resistor R1 and a first terminal B' of the second sense resistor R2 are electrically connected to the first sensing signal measuring terminal 213. A second terminal D of the fourth sense resistor R4 and a first terminal D' of the third sense resistor R3 are electrically connected to the second sensing signal measuring terminal 214, and a second terminal C of the second sense resistor R2 and a second terminal C' of the third sense resistor R3 are electrically connected to the second power signal input terminal 212. The first power signal input terminal 211 and the second power signal input terminal 212 are used for inputting a power driving signal to the pressure sensor 203, and the first sensing signal measuring terminal 213 and the second sensing signal measuring terminal 214 are used for outputting a pressure detection signal from the pressure sensor 203.

With reference to FIG. 13, the first sense resistor R1, the second sense resistor R2, the third sense resistor R3 and the fourth sense resistor R4 form a Wheatstone bridge. When a bias voltage signal is input to the first power signal input terminal 211 and the second power signal input terminal 212, a current flows through each branch in the Wheatstone bridge. In this case, when a display panel is pressed, impedance of each of the first sense resistor R1, the second sense resistor R2, the third sense resistor R3 and the fourth sense resistor R4 changes since the pressure sensor 203 is subjected to shear force from a corresponding position on the display panel, so that a difference between an electric signal outputted from the first sensing signal measuring terminal 213 and an electric signal outputted from the second sensing signal measuring terminal 214 is different from that before the pressing and accordingly a touch pressure value is determined.

Since the Wheatstone bridge is disposed on the display panel, when pressure (e.g. touch pressure) is applied to the display panel, the display panel is deformed and the first sense resistor R1, the second sense resistor R2, the third sense resistor R3 and the fourth sense resistor R4 disposed on the display panel are all deformed. To detect the touch pressure value, deformations undergone by the first sense resistor R1, the second sense resistor R2, the third sense resistor R3 and the fourth sense resistor R4 need to be different.

In one embodiment, with reference to FIG. 13, the pressure sensor 203 further includes a first extension direction 100 and a second extension direction 200. The first extension direction 100 intersects the second extension direction 200. A component of an extension length from the first terminal A to the second terminal B of the first sense resistor R1 in the first extension direction 100 is greater than that in the second extension direction 200. A component of an extension length from the first terminal B' to the second terminal C of the second sense resistor R2 in the second extension direction 200 is greater than that in the first extension direction 100. A component of an extension length from the first terminal D' to the second terminal C' of the third sense resistor R3 in the first extension direction 100 is greater than that in the second extension direction 200. A component of an extension length from the first terminal A' to the second terminal D of the fourth sense resistor R4 in the second extension direction 200 is greater than that in the first extension direction 100.

Such a configuration as shown in FIG. 13 allow the first sense resistor R1 and the third sense resistor R3 to sense strain in the first extension direction 100 and allow the second sense resistor R2 and the fourth sense resistor R4 to sense strain in the second extension direction 200. A direction in which the first sense resistor R1 senses strain is different from a direction in which the second sense resistor R2 senses strain and a direction in which the fourth sense resistor R4 senses strain is different from a direction in which the third sense resistor R3 senses strain, so the first sense resistor R1, the second sense resistor R2, the third sense resistor R3 and the fourth sense resistor R4 may be distributed in a same space or at positions close to each other. Therefore, the first sense resistor R1, the second sense resistor R2, the third sense resistor R3 and the fourth sense resistor R4 have a synchronous temperature change, thus eliminating an influence of temperature differences and improving a pressure sensing accuracy.

It should be noted that the first sensing signal measuring terminal 213 and the second sensing signal measuring terminal 214 of the pressure sensor 203 are further electrically connected to external lines. The first power signal input terminal 211 and the second power signal input terminal 212, are paths through which static electricity is transmitted to the pressure sensor 203. Therefore, not only are the first power signal input terminal 211 and/or the second power signal input terminal 212 configured to be electrically connected to an electro-static discharge unit, but the first sensing signal measuring terminal 213 and/or the second sensing signal measuring terminal 214 can also be configured to be electrically connected to an electro-static discharge unit.

Figure 14:
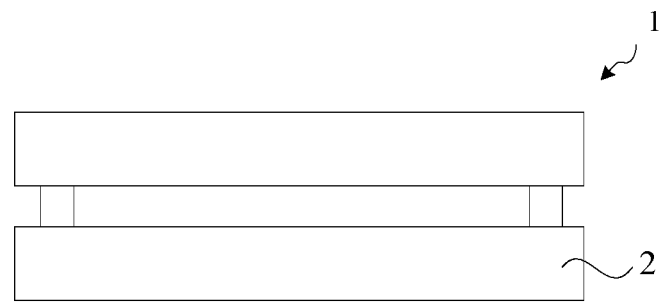
FIG. 14 is a structural diagram of a display panel according to an embodiment of the present disclosure.

FIG. 14 is a structural diagram of a display panel according to an embodiment of the present disclosure. As illustrated in FIG. 14, the display panel 1 includes the array substrate 2 described in any one of embodiments of the present disclosure.

Figure 15:
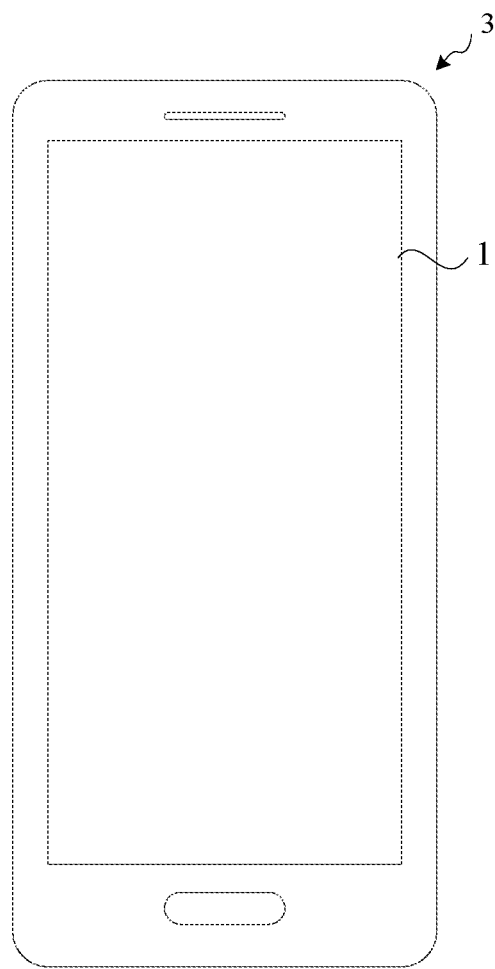
FIG. 15 is a structural diagram of a display device according to an embodiment of the present disclosure.

FIG. 15 is a structural diagram of a display device according to an embodiment of the present disclosure. As illustrated in FIG. 15, the display device 3 includes the display panel 1 described in any one of embodiments of the present disclosure.

It is to be noted that the above are only preferred embodiments of the present disclosure and the technical principles used therein. It will be understood by those skilled in the art that the present disclosure is not limited to the embodiments described herein. Those skilled in the art can make various apparent modifications, adaptations, combinations and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. An array substrate, comprising a display area and a non-display area surrounding the display area, wherein
a first power signal line, a ground potential line and a pressure sensor are disposed in the non-display area;
the pressure sensor comprises a first power signal input terminal and a second power signal input terminal, the first power signal input terminal is electrically connected to the first power signal line, and the second power signal input terminal is electrically connected to the ground potential line; and
at least one of the first power signal input terminal or the second power signal input terminal is electrically connected to an electro-static discharge unit.

2. The array substrate of claim 1, wherein the pressure sensor further comprises a first sensing signal measuring terminal and a second sensing signal measuring terminal;
the pressure sensor further comprises a first sense resistor, a second sense resistor, a third sense resistor, and a fourth sense resistor, wherein a first terminal of the first sense resistor and a first terminal of the fourth sense resistor are electrically connected to the first power signal input terminal, wherein a second terminal of the first sense resistor and a first terminal of the second sense resistor are electrically connected to the first sensing signal measuring terminal, wherein a second terminal of the fourth sense resistor and a first terminal of the third sense resistor are electrically connected to the second sensing signal measuring terminal, and a second terminal of the second sense resistor and a second terminal of the third sense resistor are electrically connected to the second power signal input terminal; and the first power signal input terminal and the second power signal input terminal of the pressure sensor are used for inputting a power driving signal to the pressure sensor, and the first sensing signal measuring terminal and the second sensing signal measuring terminal of the pressure sensor are used for outputting a pressure detection signal from the pressure sensor.

3. The array substrate of claim 1, wherein the pressure sensor further comprises a first sensing signal measuring terminal and a second sensing signal measuring terminal;
the pressure sensor is a polygon comprising at least four sides, wherein the first power signal input terminal is located at a first side of the polygon, the second power signal input terminal is located at a second side of the polygon, and the first power signal input terminal and the second power signal input terminal of the pressure sensor are used for inputting a power driving signal to the pressure sensor; and the first sensing signal measuring terminal is located at a third side of the polygon, the second sensing signal measuring terminal is located at a fourth side of the polygon, and the first sensing signal measuring terminal and the second sensing signal measuring terminal of the pressure sensor are used for outputting a pressure detection signal from the pressure sensor; and
a first straight line where the first power signal input terminal and the second power signal input terminal are located intersects a second straight line where the first sensing signal measuring terminal and the second sensing signal measuring terminal are located.

4. The array substrate of claim 3, wherein the pressure sensor is a rhombus, and a diagonal of the rhombus is parallel with the first power signal line; and
the electro-static discharge unit is located at any side of the rhombus away from a geometric center of the rhombus.

5. The array substrate of claim 3, wherein the electro-static discharge unit at least comprises a NMOS and a PMOS, wherein
a first electrode of the NMOS and a second electrode of the PMOS are electrically connected together and then are electrically connected to the first power signal input terminal or the second power signal input terminal, a gate electrode and a second electrode of the NMOS are electrically connected to a low level line, and a gate electrode and a first electrode of the PMOS are electrically connected to a high level line.

6. The array substrate of claim 5, wherein the pressure sensor is a rhombus, and a diagonal of the rhombus is parallel with the first power signal line; and
the NMOS and the PMOS of the same electro-static discharge unit are located at adjacent sides of the rhombus away from a geometric center of the rhombus respectively.

7. The array substrate of claim 5, wherein the display area comprises a plurality of first transistors, the non-display area comprises a plurality of second transistors, and a channel width-to-length ratio of at least one of the NMOS and the PMOS is greater than a channel width-to-length ratio of any one of the plurality of first transistors and greater than a channel width-to-length ratio of any one of the plurality of second transistors.

8. The array substrate of claim 5, wherein a voltage of the first power signal input terminal is less than a voltage of the high level line, and an absolute value of a voltage of the second power signal input terminal is less than a voltage of the low level line.

9. The array substrate of claim 5, wherein a scanning drive circuit is disposed in the non-display area, and a high level power line and a low level power line of the scanning drive circuit are reused as the high level line and the low level line respectively.

10. The array substrate of claim 1, wherein the first power signal input terminal and the second power signal input terminal are both electrically connected to the electro-static discharge unit, and the electro-static discharge unit is a point discharge electrode or a capacitor plate.

11. The array substrate of claim 10, wherein the electro-static discharge unit includes a first electro-static discharge unit and a second electro-static discharge unit, the first power signal input terminal is electrically connected to the first electro-static discharge unit and the second power signal input terminal is electrically connected to the second electro-static discharge unit; and
static electricity is discharged by the first electro-static discharge unit and the second electro-static discharge unit via point discharge or capacitor discharge.

12. The array substrate of claim 1, further comprising an electrostatic conductive layer, wherein an insulating layer is disposed between the electrostatic conductive layer and the at least one pressure sensor, and the electrostatic conductive layer covers at least part of the at least one pressure sensor in a stacking direction of films of the array substrate; and
the electrostatic conductive layer is electrically connected to at least one of the ground potential line and the electro-static discharge unit.

13. The array substrate of claim 12, wherein the electrostatic conductive layer comprises at least one opening, the insulating layer in an area where the opening is located includes a through hole, and the first power signal input terminal and/or the second power signal input terminal are/is electrically connected to a corresponding signal line via the through hole.

14. The array substrate of claim 12, wherein the insulating layer extends to outside an edge of the pressure sensor and has a ramp outside the edge of the pressure sensor, and the electrostatic conductive layer covers the ramp.

15. The array substrate of claim 1, wherein a scanning drive circuit is disposed in the non-display area, the scanning drive circuit includes a plurality of cascaded shift registers, and the at least one pressure sensor is located between two of the plurality of cascaded shift registers.

16. The array substrate of claim 1, wherein a plurality of first transistors are disposed in the display area, and the at least one pressure sensor and a semiconductor layer of the plurality of first transistors are disposed at a same layer.

17. The array substrate of claim 16, wherein the at least one pressure sensor and the semiconductor layer of the plurality of first transistors are formed in a same processing step.

18. A display panel, comprising an array substrate, wherein the array substrate comprises a display area and a non-display area surrounding the display area,
a first power signal line, a ground potential line and at least one pressure sensor are disposed in the non-display area;
the pressure sensor comprises a first power signal input terminal and a second power signal input terminal, the first power signal input terminal of the pressure sensor is electrically connected to the first power signal line, and the second power signal input terminal of the pressure sensor is electrically connected to the ground potential line; and the first power signal input terminal or the second power signal input terminal is electrically connected to an electro-static discharge unit.

19. A display device, comprising a display panel comprising an array substrate, wherein the array substrate comprises a display area and a non-display area surrounding the display area, a first power signal line, a ground potential line and a pressure sensor are disposed in the non-display area;

the pressure sensor comprises a first power signal input terminal and a second power signal input terminal, the first power signal input terminal is electrically connected to the first power signal line, and the second power signal input terminal is electrically connected to the ground potential line; and at least one of the first power signal input terminal or the second power signal input terminal is electrically connected to an electro-static discharge unit.

* * * * *